United States Patent
Wiegard et al.

(10) Patent No.: US 10,493,395 B2
(45) Date of Patent: Dec. 3, 2019

(54) APPARATUS AND METHOD FOR SEPARATING CONDENSABLE MATERIALS FROM AN EXHAUST AIR STREAM

(71) Applicant: SMS Group GmbH, Duesseldorf (DE)

(72) Inventors: Ulrich Wiegard, Duesseldorf (DE); Judith Ahrens, Duesseldorf (DE)

(73) Assignee: SMS Group GmbH, Duesseldorf (DE)

( * ) Notice: Subject to any disclaimer, the term of this patent is extended or adjusted under 35 U.S.C. 154(b) by 61 days.

(21) Appl. No.: 15/524,445

(22) PCT Filed: Oct. 23, 2015

(86) PCT No.: PCT/EP2015/074678
§ 371 (c)(1),
(2) Date: May 4, 2017

(87) PCT Pub. No.: WO2016/071131
PCT Pub. Date: May 12, 2016

(65) Prior Publication Data
US 2018/0272265 A1 Sep. 27, 2018

(30) Foreign Application Priority Data
Jun. 1, 2015 (DE) .......................... 10 2015 210 095

(51) Int. Cl.
*B01D 53/18* (2006.01)
*B01D 53/00* (2006.01)
(Continued)

(52) U.S. Cl.
CPC .............. *B01D 53/002* (2013.01); *B21B 9/00* (2013.01); *B01D 5/009* (2013.01);
(Continued)

(58) Field of Classification Search
CPC .... B01D 53/18; B01D 53/1406; B01D 53/14; B01D 53/1431; B01D 53/263;
(Continued)

(56) References Cited

U.S. PATENT DOCUMENTS

| | | | |
|---|---|---|---|
| 3,473,298 A | 10/1969 | Berman | |
| 4,028,072 A | 6/1977 | Braun | |
| 5,483,801 A | 1/1996 | Craze | |

FOREIGN PATENT DOCUMENTS

| | | | |
|---|---|---|---|
| CA | 2858848 | * | 12/2013 |
| DE | 4001710 | | 7/1991 |

(Continued)

*Primary Examiner* — Thuan D Dang
(74) *Attorney, Agent, or Firm* — Abelman, Frayne & Schwab

(57) ABSTRACT

The invention relates to an apparatus and to a method for separating condensable materials from an exhaust air stream. Known apparatuses of this type typically comprise a flow duct for the correspondingly contaminated exhaust air, wherein a first separator (114) and a second separator are connected in series in the flow duct (110). A fan is typically connected downstream of the two separators and operates as a suction fan in order to draw the exhaust air through said separators and to discharge the exhaust air to the environment after it has passed through both separators. In a rolling mill, order to observe predefined limit values for the proportion of condensable materials in exhaust air streams before such streams are discharged into the ambient air, the present invention provides for the exhaust air to be separated at the rolling mill itself, and, downstream, for the fan to be placed not at the outlet of the separators but upstream of the first separator. In addition, a scrubber is connected between the fan and the first separator, and a cooling device is provided between the first and second separator. Following the last of the separators, the exhaust gas streams A and B are reunited and are exhausted via a stack.

12 Claims, 3 Drawing Sheets

(51) Int. Cl.
  *B21B 9/00*  (2006.01)
  *B21B 99/00*  (2006.01)
  *B01D 5/00*  (2006.01)
(52) U.S. Cl.
  CPC ...... *B01D 2257/70* (2013.01); *B01D 2258/06* (2013.01); *B21B 99/00* (2013.01)
(58) Field of Classification Search
  CPC .. B01D 53/75; B01D 53/78; B01D 2258/025; B01D 2259/45; B01D 2257/02; B01D 2258/06; B01D 53/002; B01D 53/1487; B01D 53/24; B01D 53/72
  USPC ......... 95/229, 223, 225, 199, 149, 200, 202, 95/243; 96/243, 355
  See application file for complete search history.

(56) References Cited

FOREIGN PATENT DOCUMENTS

| | | |
|---|---|---|
| EP | 582056 | 2/1994 |
| EP | 800851 | 10/1997 |
| EP | 979670 | 2/2000 |
| JP | 5750503 | 3/1982 |
| JP | 61164618 | 7/1986 |
| JP | 62173006 | 7/1987 |
| JP | 0576520 | 10/1993 |

\* cited by examiner

APPARATUS AND METHOD FOR SEPARATING CONDENSABLE MATERIALS FROM AN EXHAUST AIR STREAM

RELATED APPLICATIONS

This application is a National Stage application of International Application PCT/EP2015/074678 filed Oct. 23, 2015 and designating the U.S.A. and claiming priority of German application DE 10 2014 222518.3 filed Nov. 4, 2014 and DE 10 2015 210095.2 filed Jun. 1, 2015, all three applications being incorporated herein by reference thereto.

The invention relates to an apparatus and a method, for separating condensable materials from an exhaust air stream The invention further relates to a roll stand and a roll train (series of roll stands) employing such an apparatus.

The set of problems involved in separating condensable materials from an exhaust air stream is basically known in the prior art. For example, reference may be made to the following publications: U.S. Pat. No. 5,483,801; EP 0979670 A1, and DE 4001710 A1.

Also known in the prior art is an apparatus for separating condensable materials from an exhaust air stream, which apparatus is configured as follows: The exhaust air is collected with the aid of an exhaust hood, and is passed to a flow duct. In the flow duct, the exhaust air stream is first passed to a separator, comprised of a plurality of knitted mesh cartridges. Oil droplets contained in the exhaust air stream agglomerate on the knitted mesh material. The oil droplets are then passed through a drainage means. The thus filtered exhaust air stream is then passed to an aerosol separator in order to filter out additional particles, particularly aerosols, from the exhaust air stream. The air stream is driven (transported) by means of a fan disposed downstream of the aerosol separator. The disposition of the fan downstream brings the advantage that the fan blades suffer less soiling by the airborne particles, particularly the oil droplets in the exhaust air, than if the fan were disposed ahead of the knitted mesh cartridges.

The background of the present invention is that in the USA limit values have been imposed for "condensable matter" in exhaust air streams. A method of determining condensable particles in exhaust air streams in stationary facilities, along with a list of applicable limit values, has been published by the U. S. Environmental Protection Agency in the regulatory publication "*Method 202—Dry impinger method for determining contensable particulate emissions from stationary sources*". An analogous regulatory publication for filterable materials in exhaust air streams has been published as "*Method 5—Determination of particulate matter emissions from stationary sources*".

Operations involving roll stands or roll trains, for rolling of metal strip materials, present particular problems in attempting to comply with regulatory limits on condensable materials in exhaust air streams. When the rolls of a roll stand exert reforming force on the metal strip, the temperature in the vicinity of the roll gap is increased substantially above normal room temperature. During the rolling process, the rolls or the metal band are/is typically treated with a cooling medium and/or a lubricating medium, which media typically contain oils. Because of the high temperatures produced in the roll gap, individual components of the cooling or lubricating medium are vaporized, which in particular involves formation of condensable materials. The exhaust air is thereby correspondingly contaminated.

Starting from the state of the art, the object of the present invention was to devise improvements in a known apparatus and a known method for separating condensable materials from an exhaust air stream; and further to devise a roll stand and a roll train employing such an apparatus; such that it is possible to comply with regulatory limits for the proportion of condensable materials in exhaust air streams, such as particularly are in effect in the USA, before the exhaust air stream is exhausted to the environmental air.

This object is achieved, as regards apparatus technology, by the claimed matter of claim 1. The inventive apparatus is characterized in that an apparatus of the general type described initially supra is modified and supplemented as follows: The fan is disposed upstream of the first separator (in the flow direction of the exhaust air stream), a scrubber is disposed between the fan and the first separator, and a cooling device is disposed between the first separator and the second separator.

In the present description, a differentiation is made between "exhaust air with condensable materials" (exhaust air stream B) and "exhaust air with filterable materials" (exhaust air stream A). The "exhaust air with condensable materials" may additionally contain filterable materials. In contrast, with "exhaust air with filterable materials" it is assumed that the air stream does not contain any amount of condensable materials which amount would be appreciable enough to be relevant for compliance with the regulatory limit values.

The terms "fan", "blower", and "ventilator" are used synonymously in the present description. The terms "oil droplets", "oil particles", and "oil mist", or the like serve only as examples of the general term, "filterable materials".

Disposing the fan upstream of the scrubber and the separator has the main effect that an underpressure (a sucking effect) prevails only at the entrance to the fan, and the air drawn in by the fan is advantageously delivered with an overpressure to the downstream components for decontaminating it, i.e. the scrubber, the first separator, the cooling device, and the second separator. The fact that the pressure in the exhaust air stream is now an overpressure instead of an underpressure, in the fan has a positive effect on the vapor pressure in the exhaust air stream. The elevated vapor pressure, under conditions of the typically elevated temperature of the exhaust air stream which still bears appreciable condensable materials, causes a first partial condensation. Furthermore, the fan, as a result of its rotating components, serves advantageously as a centrifugal separator. In particular, filterable materials in the exhaust air stream, particularly oil particles on the blades of the fan, undergo agglomeration, whereby, after they sufficiently agglomerate, they precipitate out, wherewith, in the process a larger proportion of the filterable materials present in the exhaust air stream can be diverted at this earlier stage. This described "filtration effect", particularly for the oil particles in the exhaust air stream, is dependent on the pitch and configuration of the fan blades. Thus, moving the fan upstream has the advantageous effect of substantially reducing the loading of the exhaust air with filterable materials, which air is fed to the scrubber and the other downstream components, compared to the situation with the fan being disposed downstream of the scrubber and the separators, in the flow direction. Admittedly, the described disposition does have the drawback that the fan blades suffer more intense soiling; however, this drawback is tolerable in the light of the described advantages.

Downstream of the fan, the exhaust air undergoes absorption, in a scrubber. The "mist" of filterable materials (particularly, oil particles) which is still present is scrubbed, and the scrubbing liquid is enriched in emulsifiers, which are additionally scrubbed out. This gives rise to improved scrubbing, because it enhances the affinity for the oil present in the exhaust air. Further, the temperature of the exhaust air is reduced to a further extent in the scrubber. This cooling has the positive collateral effect that part of the condensable materials in the exhaust air, particularly those with higher condensation temperatures, will be removed at an earlier stage, namely in the scrubber, along with other contaminants which are removed in the scrubber. The condensable materials would not be captured in a mechanical filter, but would pass through it.

A first separator, e.g., in the form of knitted mesh material, is disposed downstream of the scrubber; here, the entrained droplets from the scrubbing process which has just occurred are agglomerated and separated out. Following the scrubbing of the exhaust air, an important precondition for the subsequent cooling process is that the air be saturated. Subsequent cooling results in further condensation. The condensate which is produced in the cooling step is separated out, and in a second separator the entrained droplets are agglomerated and separated out. In this manner, i.e. by means of the described treatment sequence, it is thus possible to reduce the proportion of condensable materials in an exhaust air stream to below the mandatory limit value, prior to exhausting the exhaust air stream into the environmental air via a stack. Part of the condensate which is generated is reused to compensate for evaporation losses in the scrubber system, so that the scrubbing can be carried out without major supplementation of the scrubbing medium.

According to a first exemplary embodiment, at least one exhaust hood is disposed upstream of the fan (in the flow direction of the exhaust air stream), at the entrance to the flow duct. Advantageously, the exhaust hood avoids a situation in which exhaust air which is contaminated with, in particular, condensable materials, is exhausted to the environment right at its point of origin. Instead, the exhaust air is drawn in by the exhaust hood and is fed to the described flow duct.

Advantageously, at least one valve is provided in the described flow duct, for closing off the duct at one or more suitable locations.

It is basically advantageous if exhaust air bearing condensable materials is captured and treated separately from exhaust air which bears only filterable materials but not condensable materials. If it is possible to capture two such types of exhaust air separately, one may advantageously employ a second, separate flow duct for passage of a second exhaust air stream bearing filterable materials.

This has two results: With exhaust air stream B (bearing condensable materials), the efficiency is increased, due to the higher content; and with exhaust air stream A, the temperature is lower than that of exhaust air stream B, due to the absence of heating by the rolling process.

In the second flow duct (exhaust air stream A), it is proposed that a fan be provided, along with a scrubber, disposed downstream of the fan (in the flow direction), and a third separator disposed downstream of the scrubber (in the flow direction) in the second flow duct. The functioning of the fan and the scrubber in filtering the filterable materials from the exhaust air corresponds to the functioning described above.

Optionally, a cooling device, followed downstream by a fourth separator, may be provided downstream of the third separator (in the flow direction) in the second flow duct. The cooling device and fourth separator are not absolutely necessary for removing filterable materials from the second flow duct; however, if they are provided, it means that the second flow duct has the same components as are present in the flow duct for exhaust air with condensable materials. These components are namely the scrubber, the first separator, the cooling device, and the second separator. Having this redundancy of components is particularly advantageous in the event of a failure of individual components in a given flow duct, or when maintenance work is being performed; it allows one to, e.g., direct the exhaust air stream with the condensable materials through the (in the given situation) still undisturbed (i.e. complete) sequence of apparatuses (components) in the second flow duct.

For the second flow duct, it is also advantageous if the flow duct has at least one valve to allow it to be closed off at one or more appropriate locations.

It is also advantageous if the flow duct through which the exhaust air stream B is flowing, is connected to the second flow duct, through which the exhaust air stream A is flowing, downstream of the second separator, at a connecting point to a collecting duct. The two exhaust air streams are then passed through the common collecting duct and are exhausted to the environmental air, preferably via a stack. Advantageously, the introduction of the second exhaust air stream results in further reduction of the temperature of the exhaust air stream B, because as a rule the exhaust air in the second stream is cooler than the exhaust air in stream B. This advantageously facilitates additional condensation.

The above-described object of the invention is further achieved by a roll stand which is provided with the inventive apparatus. It is also advantageous to provide an exhaust hood for capturing exhaust air which bears condensable materials, disposed after the roll stand, for feeding this exhaust air into flow duct B. It is additionally advantageous to provide an additional exhaust hood over the entrance of the roll stand and an additional exhaust hood over the exit of the roll stand, in order to capture the exhaust air present there, which as a rule bears only filterable materials, and not condensable materials, and to feed such air into the second flow duct A. The reason why exhaust air contaminated with condensable materials is present after the roll stand and not at the entrance to the roll stand involves the so-called "drag flow" in the direction of movement of the metal strip. Because of the very high speed with which the metal strip moves through the roll stand, the surround air near the metal strip is carried along as "drag flow" in the direction of movement of the metal strip. With this "drag flow", the exhaust air which is in the immediate vicinity of the roll gap, and which bears condensable materials as a result of the high temperature which prevails there, is transported in the direction of the rolling. At that location, this exhaust air can be drawn in by the abovementioned exhaust hood. In contrast, at the entrance to the roll stand, the exhaust air is typically only contaminated with filterable materials, which are emitted to the surrounding air via the cooling agents applied to the rolls of the roll stand and/or to the metal strip. The abovementioned additional exhaust hood serves to capture this exhaust air. The object of the invention stated above can also be achieved by a roll train comprised of a plurality of roll stands, for rolling of (preferably) metallic rolled stock. With a roll train, the inventive apparatus is configured such that a respective exhaust hood for the flow duct is provided between a given two of the roll stands, to draw in the exhaust air which at the given point bears condensable materials, into the flow duct B; and, further, a second exhaust hood is disposed at the entrance to the first roll stand and preferably also at the end of the roll train, to draw in the exhaust air which at the given point bears filterable materials, into the second flow duct A. The reason for disposing an exhaust hood for drawing in the exhaust air bearing condensable materials between the roll stands corresponds to the abovementioned reason for disposing an exhaust hood at the exit of a roll stand. Also, the reason for disposing an exhaust hood at the entrance to the first roll stand corresponds to the abovementioned reason offered in reference to a single roll stand. The reason for not disposing any additional exhaust hoods for capturing exhaust air bearing condensable materials after the last roll stand of a roll train, but only for capturing exhaust air with filterable materials, lies in the fact that the deformation carried out by the last roll stand is no longer as great as in the first roll stands, and therefore typically there is typically no longer any vaporization of materials in the roll gap of the last roll stand, which materials would then need to be removed from the exhaust air by condensation.

Finally, the above-described object of the invention is achieved by a method for separating condensable materials from an exhaust air stream. The advantages of this method correspond to those described above with reference to the apparatus or to the roll stand.

The four drawings attached to the present Specification are as follows:

The invention will now be described in detail with reference to the above-described Figures. In all of the Figures, analogous technical elements are labeled with like reference numerals.

FIG. 1 illustrates a first exemplary embodiment of the inventive apparatus 100 for separating condensable materials from an exhaust air stream.

Figure 1:
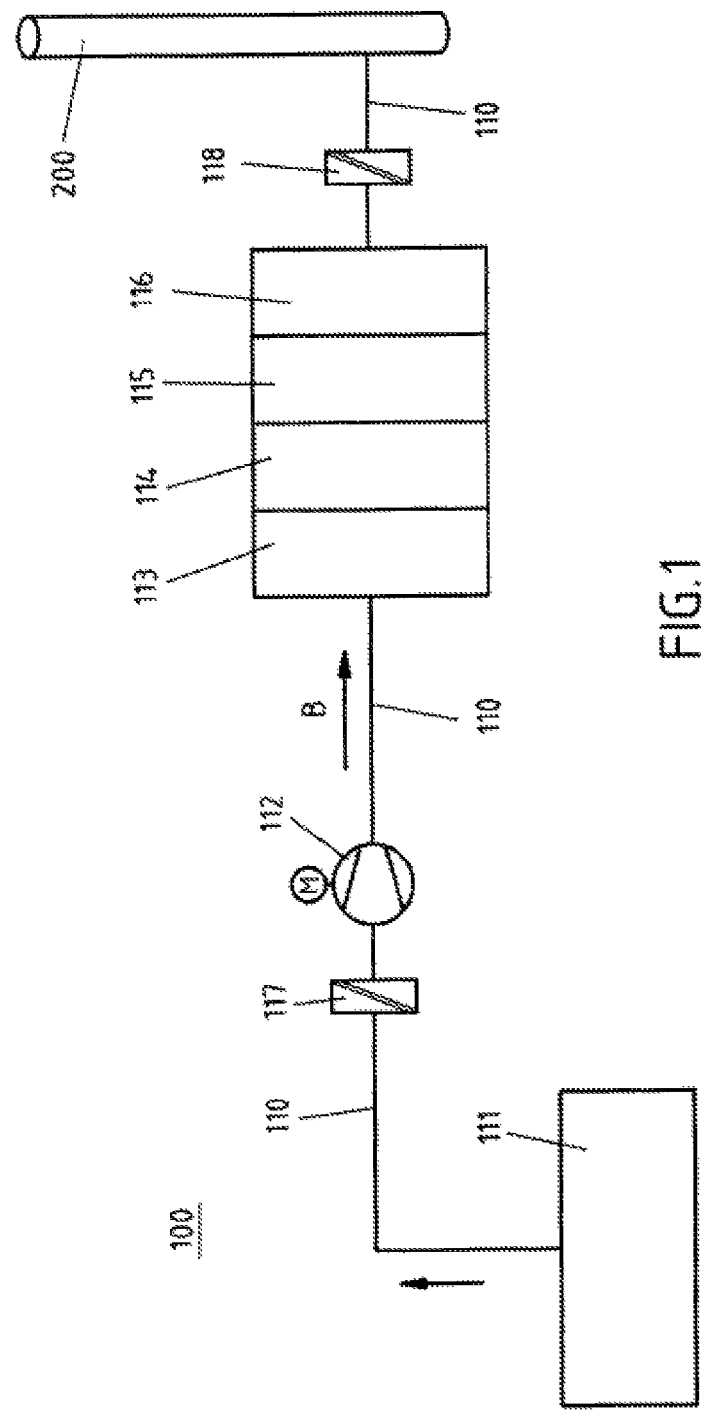
FIG. 1 illustrates the inventive apparatus for separating condensable materials from an exhaust air stream, having a first flow duct.

For this purpose, according to a first exemplary embodiment the apparatus is comprised of an exhaust hood 111 for capturing the exhaust air with the condensable materials as close as possible to its point of origin. From the exhaust hood 111 the exhaust air is passed into a flow duct 110 and there is first drawn into a fan 112. Accordingly, an underpressure is in effect upstream of the fan 112. The fan then passes the exhaust air, at overpressure, to a scrubber 113. From the scrubber, the exhaust air is passed to a first separator 114, then to a cooling device 115 where it is further cooled. The cooling device 115 cools the exhaust air to the extent that the condensable materials are condensed out of the exhaust air, to then be removed in a second separator 116. The thus decontaminated ("purified") air is then exhausted to the environment via a stack 200. Valves 117 and/or 118 may be provided in the flow duct 110, e.g. between the exhaust hood 110 and the fan 112, as well as at the exit of the second separator (considered in the flow direction). The functioning of the individual components, i.e. the fan 112, the scrubber 113, the two separators 114 and 116, and the cooling device 115, have already been described extensively above in the general section of the Specification, and these descriptions will not be repeated here.

Figure 2:
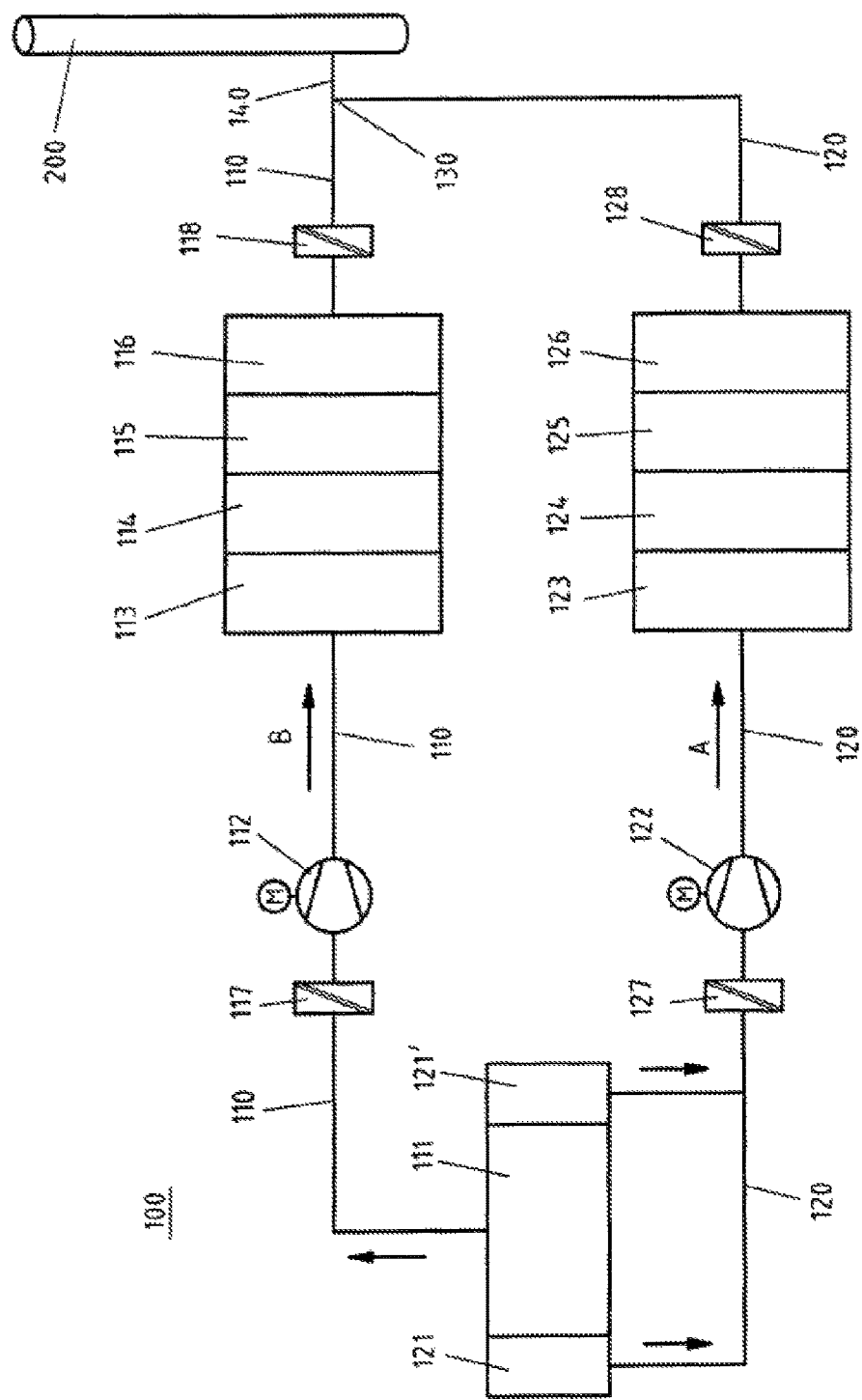
FIG. 2 illustrates the apparatus according to FIG. 1 with a flow duct, having also a second flow duct.

FIG. 2 illustrates a second exemplary embodiment of the invention. In addition to the abovementioned flow duct 110 for the air and condensable materials, the second exemplary embodiment of the inventive apparatus 100 also has a second flow duct A (also referred to as "the additional flow duct") (labeled with reference numeral 120). At the entrance to this flow duct, one or more additional exhaust hoods 121, 121' are provided to draw in the exhaust air as close as possible to its point of origin. The structure of the second flow duct 120 is essentially analogous to that of the flow duct 110. Specifically, the second flow duct is also comprised of a ventilator (fan) 122, a scrubber 123 disposed downstream of the fan, a third separator 124 downstream of the scrubber, a cooling device 125 downstream of the third separator, and a fourth separator 126 downstream of the additional cooling device. It should be noted that the presence of the cooling device 125 and the fourth separator 126 in the second flow duct 120 is only optional, because these devices are not absolutely necessary for removal of filterable materials from the exhaust air. The advantages of providing these devices were described above in the general section of the Specification. The second flow duct 120 may also have valves 127, 128, e.g. also between the exhaust hoods and the fan, and at the exit of the separator 124 or 126.

The exit of the second flow duct 120 may advantageously be connected to the exit of the flow duct 110, via connecting means at a connecting point 130; downstream of the connecting point 130 the two flow ducts open out into a common collecting duct 140 whereby the two decontaminated ("purified") exhaust air streams ("exhaust air types") are passed to the stack 200. The valves 118, 128 at the exits of the flow ducts 110 and 120, respectively, serve in particular to control the exhaust air flows into the collecting duct 140. It is advantageous to provide all of the valves (117 and 118, and 127 and 128), particularly if individual components have precipitated out in the flow ducts.

Figure 3:
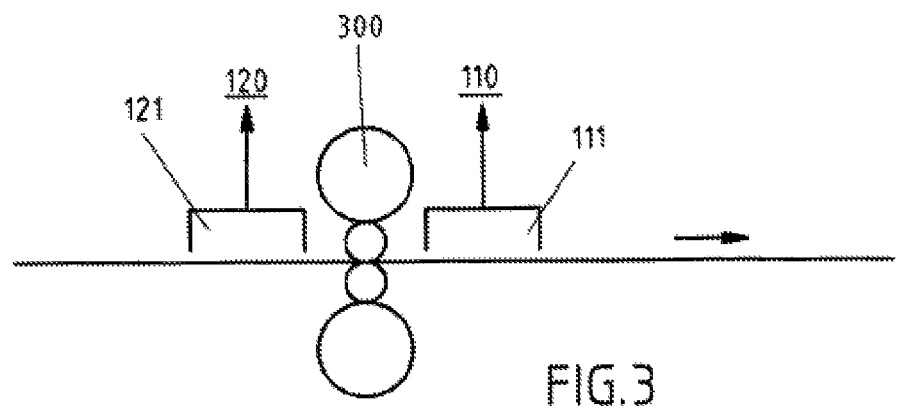
FIG. 3 illustrates a roll stand having exhaust hoods for the two flow ducts of the inventive apparatus.

FIG. 3 illustrates a roll stand 300 having an exhaust hood 111 at its exit, which hood serves to capture exhaust air having condensable materials and to convey this air into the flow duct 110. A second exhaust hood 121 is provided at the entrance side of the roll stand 300, for capture of exhaust air having filterable materials. This exhaust air is conveyed via the second exhaust hood into a second flow duct 120.

Figure 4:
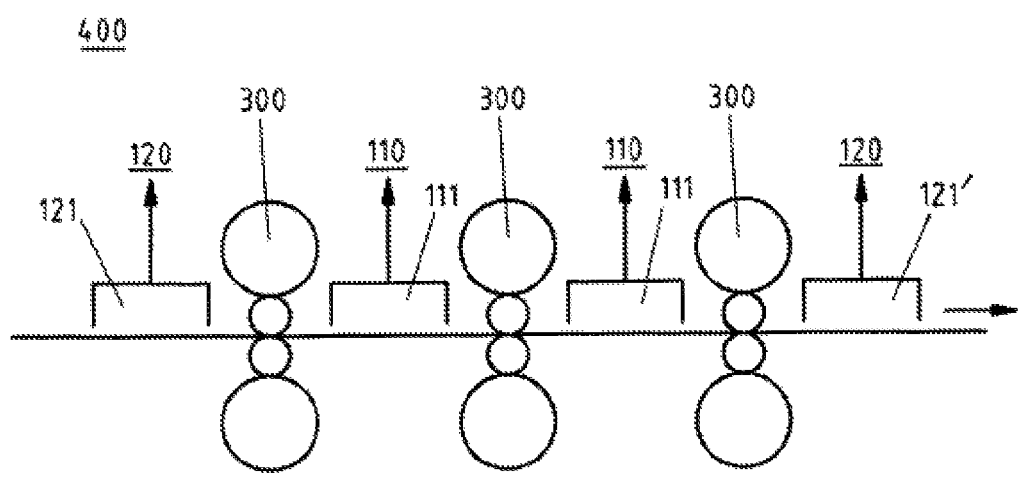
FIG. 4 illustrates a roll train (series of roll stands) having exhaust hoods for the two flow ducts of the inventive apparatus.

FIG. 4 illustrates a roll train 400 having a plurality of roll stands (a series of roll stands) 300. Between each successive pair of roll stands (three roll stands are illustrated here, for purposes of example) an exhaust hood 111 is provided, namely at the exits of the first and second roll stands, for drawing in exhaust air which bears condensable materials. In addition, additional exhaust hoods are provided, namely an exhaust hood 120 at the entrance of the first roll stand and an exhaust hood 121' at the exit of the roll train, for capturing exhaust air which is contaminated with filterable materials.

In FIGS. 3 and 4, the direction of advance of the metal strip or the like through roll stands is indicated with an arrow. Reference is made to the general section of the Specification for a description of the reasons for the arrangement of the described exhaust hoods at the respective entrances and exits of the roll stands.

LIST OF REFERENCE NUMERALS

100 Apparatus.
110 Flow duct, B.
111 Exhaust hood.
112 Fan.
113 Scrubber.
114 First separator.
115 Cooling device.
116 Second separator.

117 Valve.
118 Valve.
120 Second flow duct (additional flow duct), A.
121 Second exhaust hood.
121' Additional exhaust hood.
122 Second fan.
123 Second scrubber.
124 Third separator.
125 Second cooling device.
126 Fourth separator.
127 Valve.
128 Valve.
130 Connecting point.
200 Stack.
300 Roll stand.
400 Roll train (series of roll stands).
A Exhaust air stream with filterable materials
B Exhaust air stream with condensable materials

The invention claimed is:

1. An apparatus (100) for separating condensable materials from an exhaust air stream (B), comprised of the following:
a flow duct (110) which can convey the exhaust air stream (B) bearing said condensable materials, in a flow direction;
a first separator (114) located in the flow duct;
a fan (112) provided in the flow duct (110) upstream of the first separator (114) in the flow direction of the exhaust air stream;
a scrubber (113) is disposed between the fan (112) and the first separator (114);
characterized by
a second separator (116) located in the flow duct downstream of the first separator (114) in the flow direction of the exhaust air stream;
a cooling device (115) located between the first separator (114) and the second separator (116);
an additional flow duck (120) for conveying an additional exhaust air stream bearing filterable materials;
a further fan (122) located in the additional flow duct (120);
a further scrubber (123) located in the additional flow duct downstream of the further fan in the flow direction; and
a third separator (124) located in the additional flow duct downstream of the further scrubber (123) in the flow direction.

2. The apparatus (100) according to claim 1;
characterized by
at least one exhaust hood (111) disposed at an entrance of the flow duct (110), upstream of the fan (112) in the flow direction of the exhaust air stream.

3. The apparatus (100) according to claim 1;
characterized by
at least one valve (117, 118) for closing off the flow duct.

4. The apparatus (100) according to claim 1;
characterized by the following:
a further cooling device (125) located downstream of the third separator (124) in the flow direction, in the additional flow duct (120); and
a fourth separator (126) disposed downstream of the further cooling device in the flow direction.

5. The apparatus (100) according to claim 1,
characterized by
at least one exhaust hood (121, 121') at the entrance of the additional flow duct (120), which hood is disposed upstream of the further fan (122) in the flow direction of the second exhaust air stream.

6. The apparatus (100) according to claim 1,
characterized by
at least one valve (127, 128) for closing off the additional flow duct (120).

7. The apparatus (100) according to claim 1,
wherein a connecting point (130) for combining the outflows from the flow duct (110) and the additional flow duct (120), into a collecting duct (140) is provided, which collecting duct opens out into a stack (200).

8. A roll stand (300) for rolling of metallic rolled stock;
characterized by an apparatus (100) for separating condensable materials from an exhaust air stream (B), comprised of the following:
a flow duct (110) which can convey the exhaust air stream (B) bearing said condensable materials, in a flow direction;
a first separator (114) located in the flow duct;
a fan (112) provided in the flow duct (110) upstream of the first separator (114) in the flow direction of the exhaust air stream;
a scrubber (113) is disposed between the fan (112) and the first separator (114);
characterized by
a second separator (116) located in the flow duct downstream of the first separator (114) in the flow direction of the exhaust air stream;
a cooling device (115) located between the first separator (114) and the second separator (116);
an additional flow duck (120) for conveying an additional exhaust air stream bearing filterable materials;
a further fan (122) located in the additional flow duct (120);
a further scrubber (123) located in the additional flow duct downstream of the further fan in the flow direction; and
a third separator (124) located in the additional flow duct downstream of the further scrubber (123) in the flow direction,
wherein an exhaust hood (111) of the flow duct (110) is disposed above an exit, and an exhaust hood (121) of the additional flow duct (120) is disposed over an entrance, of the roll stand (300).

9. A roll train (400) comprised of a plurality of roll stands (300) for rolling of metallic rolled stock,
characterized by
an apparatus (100) for separating condensable materials from an exhaust air stream (B), comprised of the following:
a flow duct (110) which can convey the exhaust air stream (B) bearing said condensable materials, in a flow direction;
a first separator (114) located in the flow duct;
a fan (112) provided in the flow duct (110) upstream of the first separator (114) in the flow direction of the exhaust air stream;
a scrubber (113) is disposed between the fan (112) and the first separator (114);
characterized by
a second separator (116) located in the flow duct downstream of the first separator (114) in the flow direction of the exhaust air stream;
a cooling device (115) located between the first separator (114) and the second separator (116);
an additional flow duck (120) for conveying an additional exhaust air stream bearing filterable materials;
a further fan (122) located in the additional flow duct (120);

a further scrubber (123) located in the additional flow duct downstream of the further fan in the flow direction; and a third separator (124) located in the additional flow duct downstream of the further scrubber (123) in the flow direction, wherein: an exhaust hood (111) of the flow duct (110) is disposed between at least two of the roll stands (300), for drawing in the exhaust air which has an elevated concentration of condensable materials at that location, into the flow duct (110); and a second exhaust hood (121, 121') is disposed at the entrance of the first roll stand (300), and preferably also at the exit of the roll train, for drawing in the exhaust air which has an elevated concentration of filterable materials at that location, into the additional flow duct (120).

10. A method of separating condensable materials from an exhaust air stream, comprised of the following steps:

providing a flow duct (110) for conveying the exhaust air stream (B) bearing the condensable material, in a flow direction;

locating, in the flow duct (110), a fan (112) for drawing in the exhaust air stream with the condensable materials, at least near its point of origin;

arranging, in the flow duct (110), downstream of the fan (114), a scrubber (113) for scrubbing to remove filterable materials oil droplets and fine aerosols, from the exhaust air stream; and arranging, in the flow duct (110), downstream of the scrubber (113), a first separator (114) for separating out entrained droplets from the scrubbed exhaust air stream;

characterized by the following steps:

providing, in the flow duct (110), downstream of the first separator (114), a cooling device (115) for cooling remaining exhaust stream to condense out the condensable materials present;

arranging, in the flow duct (110), downstream of the cooling device (115), a second separator (116) for separating out the condensable materials;

providing an additional flow duct (120) for conveying additional exhaust air stream bearing filterable materials;

locating, in the additional flow duct (120), a further fan (122) for drawing in the additional exhaust air stream having filterable materials, at least near its point of origin;

providing a further scrubber (123) in the additional flow duct (120), downstream of the further fan (123) for scrubbing to remove filterable materials, especially oil droplets, from the additional exhaust air stream; and locating, in the additional flow duct (120), downstream of the further scrubber (123), a third separator (124) for separating out entrained droplets from the scrubbed additional exhaust air stream.

11. The method according to claim 10;

characterized by the following additional steps:

cooling the remaining additional exhaust air stream; and exhausting the remaining additional exhaust air stream.

12. The method according to claim 10;

characterized by the following:

combining the exhaust air streams with the condensable materials and the filterable materials into a combined exhaust air stream, and preferably, exhausting the combined exhaust air stream through a stack (280).

\* \* \* \* \*

UNITED STATES PATENT AND TRADEMARK OFFICE
CERTIFICATE OF CORRECTION

PATENT NO. : 10,493,395 B2
APPLICATION NO. : 15/524445
DATED : December 3, 2019
INVENTOR(S) : Ulrich Wiegard and Judith Ahrens Page 1 of 1

It is certified that error appears in the above-identified patent and that said Letters Patent is hereby corrected as shown below:

On the Title Page

Item (30), should read:
(30) Foreign Application Priority Data
Nov. 4, 2014 (DE) .............. 10 2014 222 518

Signed and Sealed this
Twenty-eighth Day of January, 2020

Andrei Iancu
*Director of the United States Patent and Trademark Office*